Sept. 25, 1956         D. R. BUCHELE         2,764,065
ANAMORPHIC LENS SYSTEM
Filed March 10, 1955

INVENTOR
DONALD R. BUCHELE
BY
ATTORNEYS

United States Patent Office 2,764,065
Patented Sept. 25, 1956

2,764,065

ANAMORPHIC LENS SYSTEM

Donald R. Buchele, Berea, Ohio, assignor to United States of America as represented by the Secretary of the Navy Application March 10, 1955, Serial No. 493,583

1 Claim. (Cl. 88—57)

(Granted under Title 35, U. S. Code (1952), sec. 266)

The invention described herein may be manufactured and used by or for the Government of the United States of America for governmental purposes without the payment of any royalties thereon or therefor.

This invention relates to an anamorphic lens system for producing magnification in two mutually perpendicular directions. While the invention is susceptible to general uses it has particular utility, and will be specifically described, in connection with the examination of boundary layer conditions on wind-tunnel models, in the field of aeronautics.

Camera means are available, including the schlieren optical systems, for studying model boundary conditions due to high speed air flow. A typical field of view with the ordinary camera might be around twenty inches in the direction of air flow and one inch in a direction perpendicular to the airflow, and with this field imaged by a conventional camera lens on one frame of a 16 mm. motion picture film, sufficient detail of the relatively thin boundary layer cannot be readily obtained.

To overcome this difficulty, it has been proposed to employ afocal attachments to symmetrical lens systems, such as cylindrical lenses or prisms; or the complete lens system may use cylindrical lenses. The disadvantage of these methods lies in their inability to supply both a large angular field of view and a large ratio of magnification in two mutually perpendicular directions.

Generally stated, this invention is a lens system, applicable to a schlieren optical system, that yields an image in which the magnification perpendicular to the airflow is much greater than the magnification parallel to the airflow.

An important object of the invention, therefore, is to provide an optical lens system with fixed focal points which produces unequal magnification in two mutually perpendicular directions. Another object is to provide a lens system for camera use in which there is present both a large angular field of view and a large ratio of magnification in two mutually perpendicular directions. Still another object is to provide a lens system for camera uses in which image aberration is radically reduced.

Other objects and many of the attendant advantages of this invention will be readily appreciated as the same becomes better understood by reference to the following detailed description when considered in connection with the accompanying drawings wherein.

Figure 1:
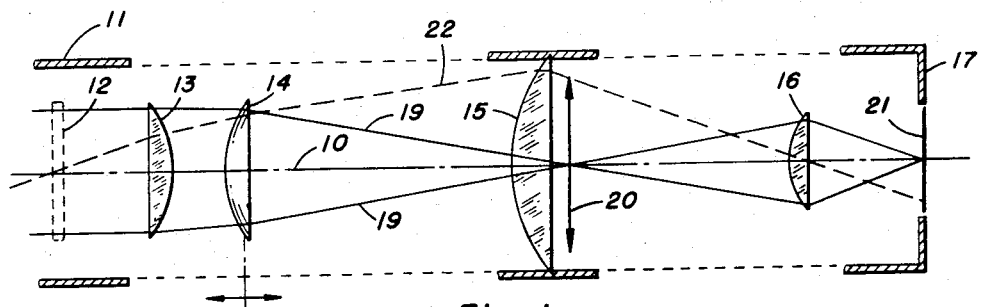
Fig. 1 is a horizontal view partly in section of a portion of a schlieren lens system incorporating the invention.
Figure 2:
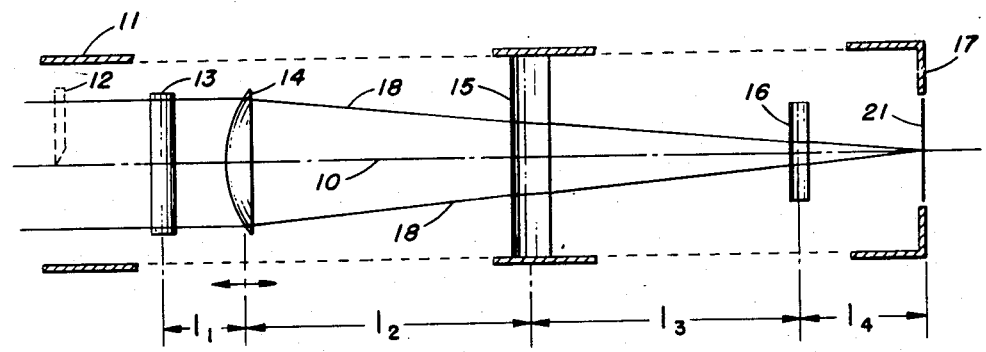
Fig. 2 is a vertical view partly in section of the portion of a schlieren lens system, as shown in Fig. 1.

Considering the showing of Figs. 1 and 2, these figures indicate the knife edge-final image section of a schlieren lens system with the various elements of the added lens system included. At the extreme left of the optical axis 10, within casing 11, is positioned the usual knife edge 12 serving as an entrance pupil and knife edge aperture stop for the light flow. To the right of the knife edge along the optical axis, is positioned two adjacent lenses, the first lens 13 being a plano-convex cylindrical lens with a vertical axis and the second lens 14, a plano-convex spherical lens serving as the telescopic achromatic objective of the lens system. Two additional lenses 15 and 16 are interposed on the optical axis between lens 14 and the image screen 17, lens 16 being placed adjacent the screen and lens 15 about half way between lenses 14 and 16, both lenses 15 and 16 being plano-convex and cylindrical with vertical axes.

On inspection, it is apparent that the image produced by the described lens system is described by rays in two perpendicular planes containing the optical axis. In the vertical plane, as indicated by light beams 18 in Fig. 2, the cylindrical lenses 13, 15 and 16 are equivalent to plane windows and, hence, lens 14 focuses the ray pencils 18 at the final image plane. The effective focal length (EFL) of the lens system in the vertical plane is, therefore, $$EFL_v = f_{14} \approx l_2 + l_3 + l_4 \cdot$$

(1)

where $f_{14}$ is the focal length of lens 14 and $\approx$ indicates approximately equals.

In the horizontal plane (Fig. 1), as indicated by light beam 19, lenses 13 and 14 focus at the intermediate image plane 20, and this intermediate image is relayed by lens 16 to the final image 21 of the image plane at screen 17. The effective focal length in the horizontal plane is that of lenses 13 and 14 multiplied by the magnification ratio of image 21 to image 20. That is, $$EFL_h \approx l_4/l_3 [f_{13} f_{14}/(f_{13}+f_{14})] \cdot$$

(2)

where $f_{13}$ is the focal length of lens 13.

If the dimensions of the object and image are given as, $h$ = height of object $\qquad w$ = width of object
$h^1$ = height of image $\qquad w^1$ = width of image then the ratio $EFL_h/EFL_v$ for an object at infinity is required to be $$EFL_h/EFL_v = (w'h)(wh')$$

(3)

The numerical value of $EFL_v$ to be used may be computed by elementary lens formulas, allowing for the effect of other optics that may be present between the lens system and the object. For example, in a two mirror schlieren system one schlieren mirror located between the lens system and the object produces a virtual object at a new object distance whose height $h^*$ and width $w^*$ replace $h$ and $w$ in the preceding formulas. The value of $EFL_v$ having been thus determined, the value of $EFL_h$ is computed by applying Equation 3 first, and then Equation 2.

As shown by the principal ray 22 in the horizontal plane, the entrance pupil at the location of the schlieren knife edge is focused by field lens 15 close to the plane of lens 16. Thus, the image forming lenses 13, 14 and 16 are pierced by the principal ray close to the optical axis and thereby introduce a minimum of aberration. Skew rays focus as well as tangential rays.

One important characteristic of the described lens system is a result of the different effective focus lengths in horizontal and vertical planes. The lens system, when adjusted for a stigmatic focus at the designed object distance, becomes astigmatic for all other object distances. Therefore, distance $l_1$ is made sufficiently large to allow appropriate longitudinal adjustment of lens 14. Adjustment of lens 14 is correct when a point source of light, placed in the object plane, produces a stigmatic image as observed with the aid of an eyepiece. In this arrangement, also, the effective focal length varies progressively in planes intermediate between the horizontal and vertical; and straight lines in the object appear straight in the image.

Figure 3:
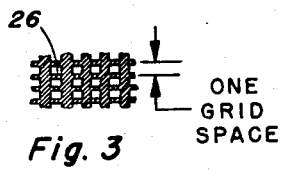
Fig. 3 is a detail of a square grid.
Figure 4:
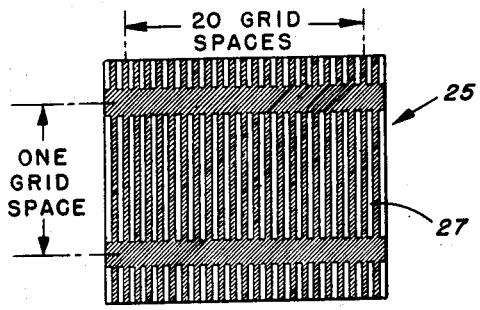
Fig. 4 is a copy of a photograph of the square grid of Fig. 3 showing the extent of vertical magnification with the disclosed system.

The image quality of the lens system is shown in Figs. 3 and 4, Fig. 4 being a copy 25 of a photograph of a grid having square openings as shown at 26 in Fig. 3. The squares of the grid are seen to be elongated into rectangle 27 having sides in the ratio of about 24 to 1. Field curvature and distortion are shown to be inappreciable in this figure.

Figure 5:
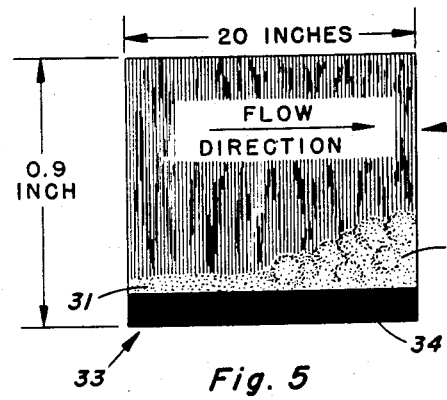
Fig. 5 is a view showing the transition from laminar to turbulent flow on a cylinder boundary layer, as revealed by the disclosed optical system.

Figure 5 is an enlargement of a 16 millimeter motion picture lens frame 30 showing a laminar boundary layer 31 and its transition to turbulence 32 on the surface of a 5-inch diameter, 2 foot long, thin-walled cylinder 33 having its axis alined with the airflow. Only the upper section 34 of the cylinder is visible. With a camera speed of 3600 frames per second the movement of the transition region and other aspects of the flow field are observable. The light source for this photograph was a B–H6 mercury lamp operated on direct current and focused on a rectangular aperture to provide an image 3/64 inch high by 1/8 inch wide at the schlieren knife edge location. Table 1 lists the dimensions of the optical system used in producing the photograph of which Fig. 5 is a copy.

Table I

| Lens | Focal length (inches) | Diameter (inches) | Spacing (inches) |
|---|---|---|---|
| 13 | 40.0 | 1.5 | $l_1$=1.5 |
| 14 | 36.0 | 1.6 | $l_2$=18.5 |
| 15 | 10.0 | 3.0 | $l_3$=19.6 |
| 16 | 1.5 | 1.0 | $l_4$=1.0 |

The $l$-values in the table correspond to the dimensions of Fig. 2.

It is pointed out that the high ratio of magnifications between the vertical and horizontal directions is secured without sacrifice of any performance features of the associated schlieren system; the system is subject to easy and accurate adjustment; and that image aberration is reduced to a minimum value.

Obviously many modifications and variations of the present invention are possible in the light of the above teachings. It is therefore to be understood that within the scope of the appended claim the invention may be practiced otherwise than as specifically described.

What is claimed is:

A lens system for producing unequal magnification in two mutually perpendicular directions, comprising a tubular casing and a plurality of optical devices positioned in optical alignment within said casing, said devices including a knife edge aperture stop for light rays at one end of said casing, a screen positioned at the opposite end of said casing, objective lens elements positioned adjacent to said aperture stop between said stop and screen for producing an astigmatic image of the object, said lens elements including in series from said aperture stop a positive cylindrical lens and a planospherical convex lens, a second positive cylindrical lens positioned between said objective lens elements and screen, and a relay cylindrical lens between said second cylindrical lens and screen, said image having a sagittal focus at said screen and a tangential focus between said screen and said objective lens elements, and said relay lens being positioned between said screen and said tangential focus for relaying said tangential image to said screen, the axes of said cylindrical lenses being parallel to each other.

References Cited in the file of this patent

UNITED STATES PATENTS

| | | |
|---|---|---|
| 988,720 | Kohler | Apr. 4, 1911 |
| 1,938,808 | Ceccarini | Dec. 12, 1933 |
| 2,036,622 | Emmerich | Apr. 7, 1936 |
| 2,143,059 | Dimmick | Jan. 10, 1939 |
| 2,391,430 | Macek | Dec. 25, 1945 |
| 2,428,399 | Timoney | Oct. 7, 1947 |

FOREIGN PATENTS

| | | |
|---|---|---|
| 8,512 | Great Britain | of 1898 |
| 624,178 | Germany | Jan. 14, 1936 |